(12) United States Patent
Gamon et al.

(10) Patent No.: US 7,835,902 B2
(45) Date of Patent: Nov. 16, 2010

(54) TECHNIQUE FOR DOCUMENT EDITORIAL QUALITY ASSESSMENT

(75) Inventors: Michael Gamon, Seattle, WA (US); Anthony Aue, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1163 days.

(21) Appl. No.: 10/969,119

(22) Filed: Oct. 20, 2004

(65) Prior Publication Data
US 2006/0100852 A1 May 11, 2006

(51) Int. Cl.
G06F 17/28 (2006.01)
G06F 17/21 (2006.01)
G06F 7/00 (2006.01)

(52) U.S. Cl. .................... 704/9; 704/8; 704/7; 707/737
(58) Field of Classification Search ................. 704/7–9; 707/737
See application file for complete search history.

(56) References Cited

U.S. PATENT DOCUMENTS

| | | | |
|---|---|---|---|
| 5,659,766 A * | 8/1997 | Saund et al. | 704/9 |
| 5,692,187 A * | 11/1997 | Goldman et al. | 707/203 |
| 5,806,078 A * | 9/1998 | Hug et al. | 715/205 |
| 5,819,306 A * | 10/1998 | Goldman et al. | 711/100 |
| 5,857,207 A * | 1/1999 | Lo et al. | 707/203 |
| 5,870,764 A * | 2/1999 | Lo et al. | 707/203 |
| 5,966,686 A * | 10/1999 | Heidorn et al. | 704/9 |
| 6,115,683 A * | 9/2000 | Burstein et al. | 704/1 |
| 6,234,806 B1 * | 5/2001 | Trenholm et al. | 434/322 |
| 6,356,864 B1 * | 3/2002 | Foltz et al. | 704/1 |
| 6,366,759 B1 * | 4/2002 | Burstein et al. | 434/353 |
| 6,424,971 B1 * | 7/2002 | Kreulen et al. | 707/737 |
| 6,796,800 B2 * | 9/2004 | Burstein et al. | 434/335 |
| 6,947,933 B2 * | 9/2005 | Smolsky | 707/693 |
| 6,990,628 B1 * | 1/2006 | Palmer et al. | 715/234 |
| 7,016,895 B2 * | 3/2006 | Dehlinger et al. | 707/750 |
| 7,024,408 B2 * | 4/2006 | Dehlinger et al. | 707/739 |
| 7,088,949 B2 * | 8/2006 | Burstein et al. | 434/353 |
| 7,313,513 B2 * | 12/2007 | Kinder | |
| 2002/0002567 A1 * | 1/2002 | Kanie et al. | 707/513 |
| 2002/0052901 A1 * | 5/2002 | Guo et al. | 707/531 |
| 2003/0028566 A1 * | 2/2003 | Nakano | 707/538 |
| 2004/0111388 A1 * | 6/2004 | Boiscuvier et al. | 707/1 |

(Continued)

OTHER PUBLICATIONS

Vinokourov et al., "A Probabilistic Framework for the Hierarchic Organisation and Classification of Document Collections," Journal of Intelligent Information Systems, vol. 18, No. 2-3, pp. 153-172, 2002.*

(Continued)

*Primary Examiner*—James S Wozniak
*Assistant Examiner*—Abdelali Serrou
(74) *Attorney, Agent, or Firm*—Westman, Champlin & Kelly, P.A.

(57) ABSTRACT

A computer-implemented system and method for assessing the editorial quality of a textual unit (document, paragraph or sentence) is provided. The method includes generating a plurality of training-time feature vectors by automatically extracting features from first and last versions of training documents. The method also includes training a machine-learned classifier based on the plurality of training-time feature vectors. A run-time feature vector is generated for the textual unit to be assessed by automatically extracting features from the textual unit. The run-time feature vector is evaluated using the machine-learned classifier to provide an assessment of the editorial quality of the textual unit.

28 Claims, 4 Drawing Sheets

U.S. PATENT DOCUMENTS

2004/0205653 A1* 10/2004 Hadfield et al. ............. 715/530
2005/0131702 A1* 6/2005 Bodin et al. ............. 704/270.1

OTHER PUBLICATIONS

Gaussier et al., "A hierarchical model for clustering and categorising documents," Advances in Information Retrieval—Proceedings of the 24.sup.th BCS-IRSG European Colloquium on IR Research (ECIR-02), Lecture Notes in Computer Science 2291, pp. 229-247, (Spring 2002).*

L.S. Larkey and W.B. Croft, "A Text Categorization Approach to Automated Essay Grading", Shermis, Mark D. and Jill C. Burstein (eds.), Automated Essay Scoring, Lawrence Erlbaum Associates, 2003, pp. 55-70.

T.K. Landauer, D. Laham and P. W. Foltz, "Automated Scoring and Annotation of Essays with the Intelligent Essay Assessor", Shermis, Mark D. and Jill C. Burstein (eds.), Automated Essay Scoring. Lawrence Erlbaum Associates pp. 87-112, (2003).

* cited by examiner

TECHNIQUE FOR DOCUMENT EDITORIAL QUALITY ASSESSMENT

BACKGROUND OF THE INVENTION

The present invention relates to automated language systems. More specifically, the present invention relates to a computer-implemented technique for document editorial quality assessment.

Small, medium and large organizations often have a number of their documents prepared by third parties. Such documents are not always of a consistent quality/style and therefore may have to go through one or more quality/style edits to better enable the intended audience to relatively rapidly and accurately understand the information as it is presented in the documents. Thus, in a typical organization, editors have to review documents received from third parties and, if necessary, send them back for correction. Each iteration of receiving a draft of a document, reviewing it and, if necessary, sending it back for correction is time consuming and costly.

More recently, efforts have been made to develop automatic document quality/style assessment systems. However, the development and/or implementation of such systems has at best only involved partial automation. For example, the development of one such system involves including "hand-coded" style/quality rules in the source code of the system software. These hand-coded rules are contrived by humans (for example, technical writers) who grade a number of documents, for example, and use these grades or scores to construct the rules that form the decision-making foundation of the system. Due to the significant human involvement at the front end of developing the system, cost considerations limit the number of documents that can be graded to develop the rules. This results in compromising the accuracy of the system.

A prior art essay scoring technique is described in an article by Leah S. Larkey and W. Bruce Croft (2003) entitled "A Text Categorization Approach to Automated Essay Grading." (In: Mark D. Shermis and Jill C. Burstein (eds.) (2003): *Automated Essay Scoring. Lawrence Erlbaum Associates*.) This technique requires a supervised learning approach. Specifically, the system needs to be trained on essays that have been assigned a score by one or several human graders. Further, this essay scoring technique relies on a relatively small set of features that correlate with grades assigned by the human graders and are often specifically chosen to emulate criteria used by human graders. Additionally, this technique has the goal of assessing writing quality according to an agreed upon standard, shared by the human graders, and defined, for example, in instructions and training of teaching candidates in the educational system who will be responsible for the grading of tests.

There is a need to further automate document editorial quality/style assessment.

SUMMARY OF THE INVENTION

A computer-implemented system and method for assessing the editorial quality of a textual unit (document, document section, paragraph or sentence) is provided. The method includes generating a plurality of training-time feature vectors by automatically extracting features from first and last versions of training documents. The method also includes training a machine-learned classifier based on the plurality of training-time feature vectors. A run-time feature vector is generated for the textual unit to be assessed by automatically extracting features from the textual unit. The run-time feature vector is evaluated using the machine-learned classifier to provide an assessment of the editorial quality of the textual unit.

DETAILED DESCRIPTION OF ILLUSTRATIVE EMBODIMENTS

The present invention relates to a computer-implemented system and method for document editorial quality/style assessment. In general, the present invention includes training a machine-learned classifier using features that are automatically extracted from first and last versions of a number of training documents, and evaluating a document to be assessed using the machine-learned classifier. The machine-learned classifier provides a quality/style assessment output relating to the editorial quality of the document. However, before describing the present invention in greater detail, one illustrative computing environment in which the present invention can be implemented will be discussed.

Exemplary Computing Environment

Figure 1:
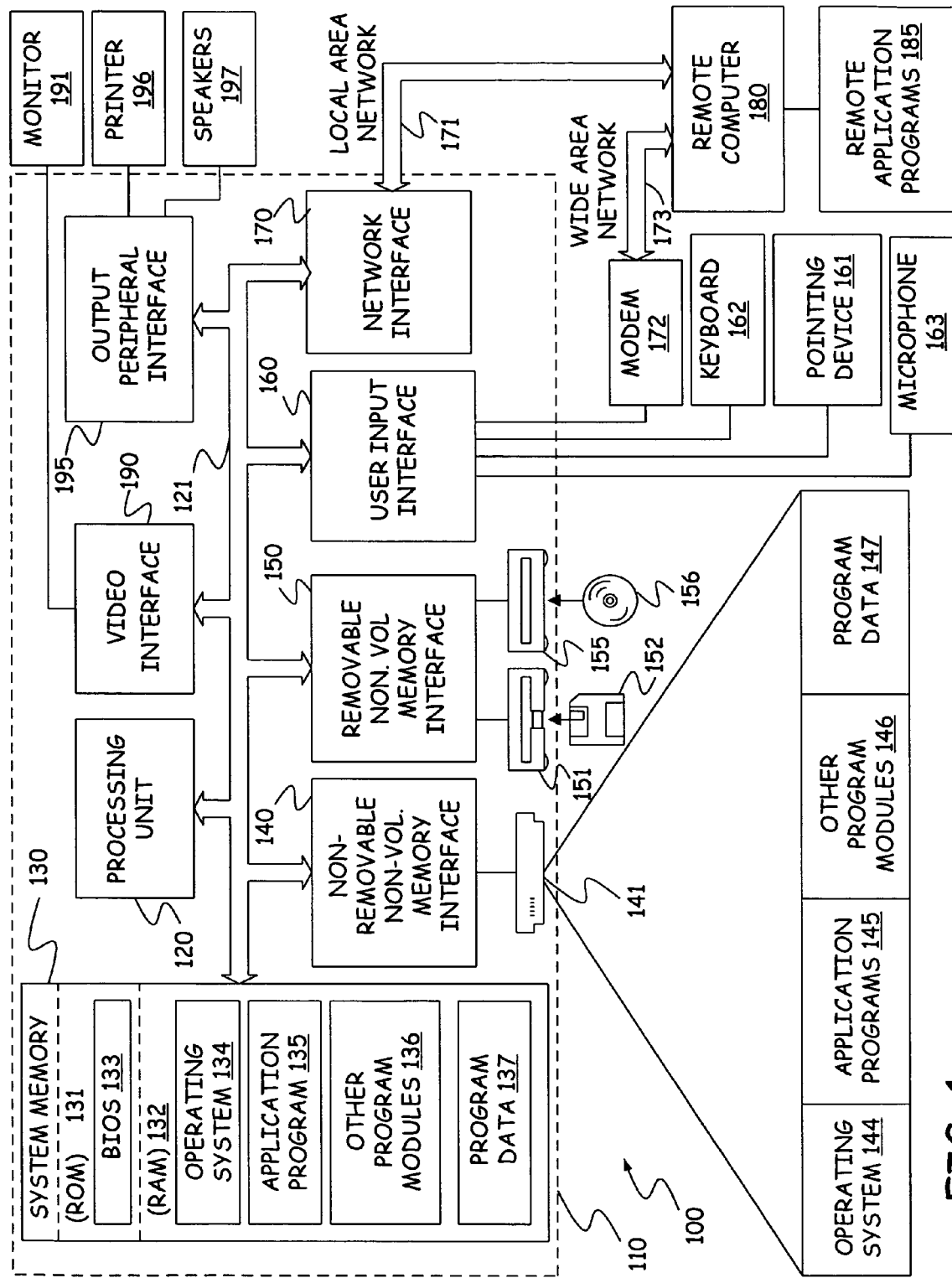
FIG. 1 is a block diagram of one illustrative computing environment in which the present invention can be implemented.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

General Document Assessment System and Method Description

As mentioned above, prior art document quality/style assessment systems have several disadvantages. These disadvantages include high cost, and the necessity for human-graded training data, etc.

Under the present invention, a substantially completely automated document quality/style assessment system is provided. As noted above, in general, the present invention includes training a machine-learned classifier using features that are automatically extracted from first and last versions of a number of training documents, and evaluating a document to be assessed using the machine-learned classifier. The machine-learned classifier provides a numeric quality/style assessment output relating to the editorial quality of the document.

In contrast with the prior art essay scoring system described earlier, which needs to be trained on essays that have been assigned a score by one or several human graders, training documents employed in the present invention do not require any human evaluation. The foundation of the present invention is based on the insight that changes made by editors from initial to final versions of documents reflect a general move towards higher document quality. Further, as mentioned earlier, the prior art essay scoring technique relies on a relatively small set of features, which correlate well with grades assigned by the human graders. However, as will be more apparent in the description provided further below, the present invention leverages a very large number of features from different levels of document analysis. This enables aspects of the present invention to take advantage of phenomena that express themselves at the sentence, paragraph and section level as well as the overall document level. Also, many features used in the present invention are different than those in the prior art essay scoring system. Further, in contrast with the prior art essay scoring technique, which has a limited goal of assessing writing quality according to an agreed upon standard shared by the human graders, the document editorial quality assessment system of the present invention goes beyond such notions of "coherent" and "fluent" writing. Thus, aspects of the present invention include the recognition that editorial content may be perfectly fluent, error free and coherent, but may still not adhere to the guidelines specific for (as an example) technical writing. Consequently, embodiments of the present invention utilize a large and diverse feature set to capture, as much as possible, all aspects of stylistic variation (within texts which may already be perfectly coherent, grammatically well-formed and error-free). A first embodiment of the present invention is described below in connection with FIG. 2.

Figure 2:
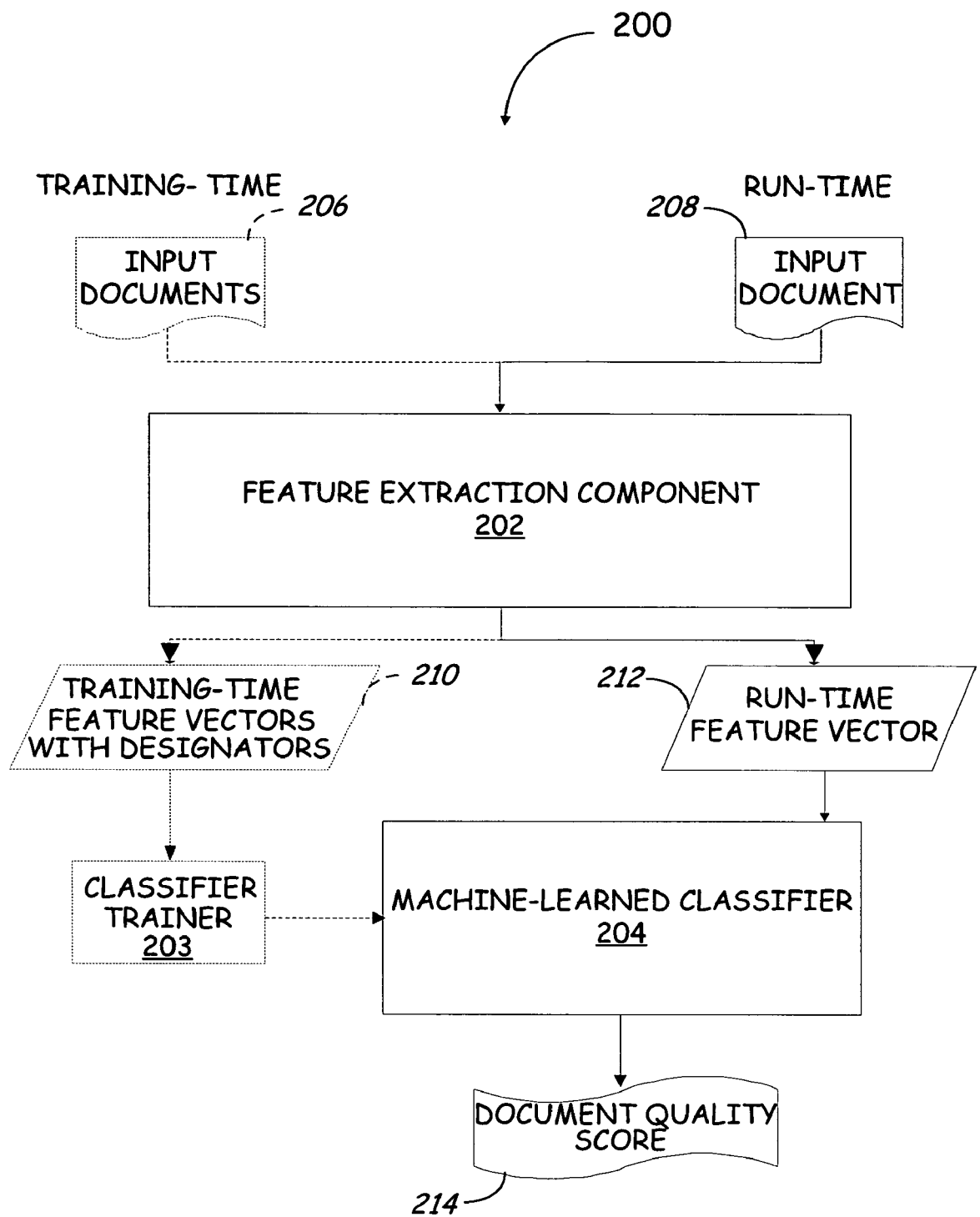
FIG. 2 is a simplified block diagram showing steps and components of an illustrative embodiment of a document editorial quality assessment system of the present invention.

FIG. 2 is a simplified block diagram showing steps and components of document editorial quality assessment system 200 of the present invention. As can be seen in FIG. 2, system 200 includes a feature extraction component 202 and a machine-learned classifier 204 that is trained using features that are extracted, by component 202, from first and last versions of a number of training documents. This training is accomplished using a classifier trainer 203. As used herein, first versions of documents represent a class of text that can be described as "unedited" or "first drafts," while the last versions of the same documents represent "highly edited" or even "publishable" versions. As noted, "unedited" or "first drafts" can be well written grammatically, but differ from "highly edited" or "publishable" final drafts based on some stylistic criteria. In FIG. 2, steps that are carried out at training-time are represented by dashed lines and steps carried out at run-time are represented by solid lines.

During training, training documents 206 (first drafts and final versions) are input into feature extraction component 202. Component 202 extracts features from each of training documents 206 and generates a training-time vector for each one of training document 206, thereby producing a plurality of training-time vectors 210. It should be noted that each of the plurality of training-time vectors 210 includes a designator of the editorial quality (e.g., first draft, final version, etc.) of the training document to which it corresponds.

In embodiments of the present invention, features extracted by component 202 include (but are not limited to):
1. Grammar and spelling related features.
2. Word n-grams.
3. Linguistic analysis features based on automatic syntactic and semantic analysis of sentences in a document.

As mentioned above, machine-learned classifier 204 is trained based on a large number of training-time feature vectors 210, with each of training-time feature vectors 210 corresponding to one of many input documents 206. While the number of documents 206 which are of "first draft" need not be exactly the same as the number which are of "final version" quality, a large number of each category of documents is beneficial for training classifier 204 to distinguish between these. Details regarding machine-learned classifiers are provided further below.

At run-time, a document 208 to be assessed is input into component 202. As in the case of training documents 206, component 202 extracts features from document 208 and generates a run-time feature vector 212 for document 208. Run-time feature vector 212 is input into machine-learned classifier 204. Classifier 204 evaluates run-time feature vector 212 based upon its prior training and provides an assessment or score 214 of the editorial quality of document 208. The assessment or score can be in any of a wide variety of formats.

It should be noted that a large number of features are provided to classifier trainer 203, and classifier trainer 203 selects which features best correlate to different "qualities" of documents. No human selection of features is necessary; classifier trainer 203 picks which ones are best. The three types of features listed earlier, which are extracted by component 202, are discussed in greater detail further below with respect to FIG. 5. However, for further clarification, examples of linguistic analysis features based on syntactic and/or semantic analysis are provided first in the following description of logical forms.

Logical Form Type Linguistic Analysis Features

Examples of linguistic analysis type features include features based upon logical forms (LFs). Prior to discussing the present invention in greater detail, a brief discussion of a LF may be helpful. A full and detailed discussion of LFs and systems and methods for generating them can be found in U.S. Pat. No. 5,966,686 to Heidorn et al., issued Oct. 12, 1999 and entitled METHOD AND SYSTEM FOR COMPUTING SEMANTIC LOGICAL FORMS FROM SYNTAX TREES. Briefly, however, LFs are generated by performing a morphological and syntactic analysis on an input text to produce conventional phrase structure analyses augmented with grammatical relations. Syntactic analyses undergo further processing in order to obtain LFs, which are data structures that describe labeled dependencies among content words in the textual input.

In general, a LF is a data structure of connected logical relations representing a single input, such as a sentence or portion thereof. The LF minimally consists of one logical relation and portrays structural relationships (i.e., syntactic and semantic relationships), particularly argument and/or adjunct relation(s) between important words in an input string.

Figure 3:
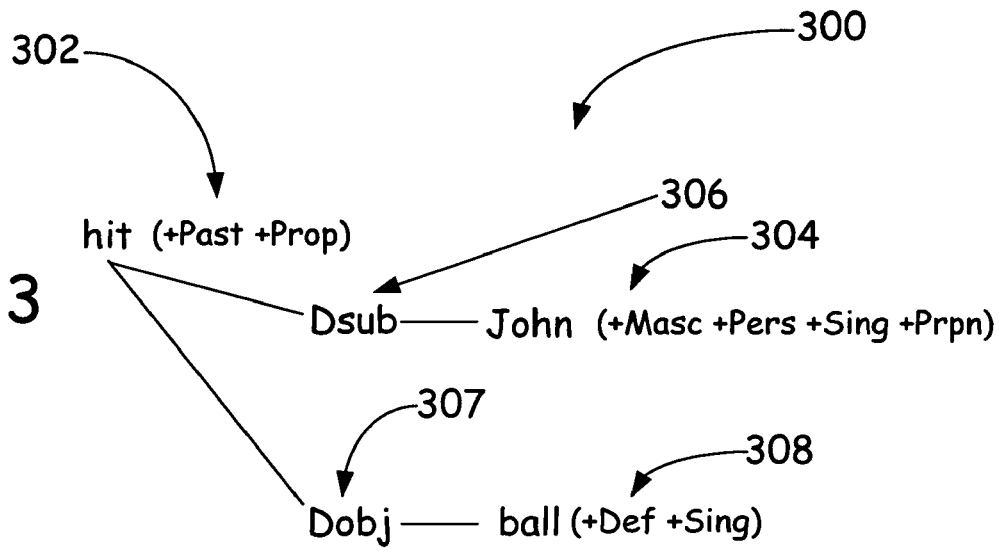
FIGS. 3 and 4 illustrate examples of logical forms.
Figure 4:
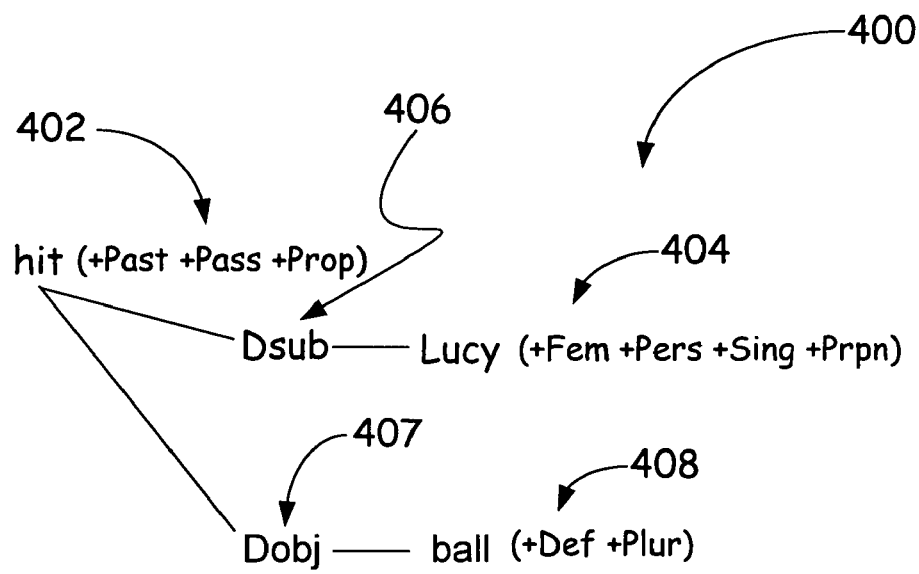

LFs can normalize certain syntactical alternations, (e.g., active/passive) and resolve both intrasentential anaphora and long distance dependencies. For example, FIGS. 3 and 4 illustrate LFs or dependency graphs 300 and 400 for a pair of active and passive sentences to help provide an understanding of the elements of LFs. However, as appreciated by those skilled in the art, when stored on a computer readable medium, the LFs may not readily be understood as representing a graph.

FIGS. 3 and 4 illustrate LFs 300 and 400. LFs 300 and 400 include parent nodes 302 and 402, children nodes 304, 308, 404 and 408 and semantic relations 306, 307, 406, and 407. Semantic relationships 306, 307, 406 and 407 operate to connect children nodes 304, 308, 404, and 408 to parent nodes 302 and 402 and explain the semantic relationship between parent and children nodes.

Parent nodes 302 and 402 contain word forms or lemmas. For example, the lemma in parent nodes 302 and 402 is the word "hit." Child nodes 304, 308, 404, and 408 also contain word forms or lemmas. The semantic relationships 306 and 406 illustrate that child nodes 304 and 404 are deep subjects and semantic relationships 307 and 407 indicate that child nodes 308 and 408 are deep objects of parent nodes 302 and 402. In addition, LFs 300 and 400 also include binary features (or "bits") attached to each lemma in each node. For example, the binary features are attached to each lemma of LFs 300 and 400 and are illustrated in parentheticals. Binary features describe properties of a node. For example, the word form in node 302 includes bits that describe the node "hit" as past tense and as a proposition.

It should be noted that the above description relates only to certain general features or aspects of LFs. Features of LFs, which are more suitable for certain embodiments of the present invention, are described further below in connection with FIG. 5.

Particular Document Assessment System and Method Embodiment

Figure 5:
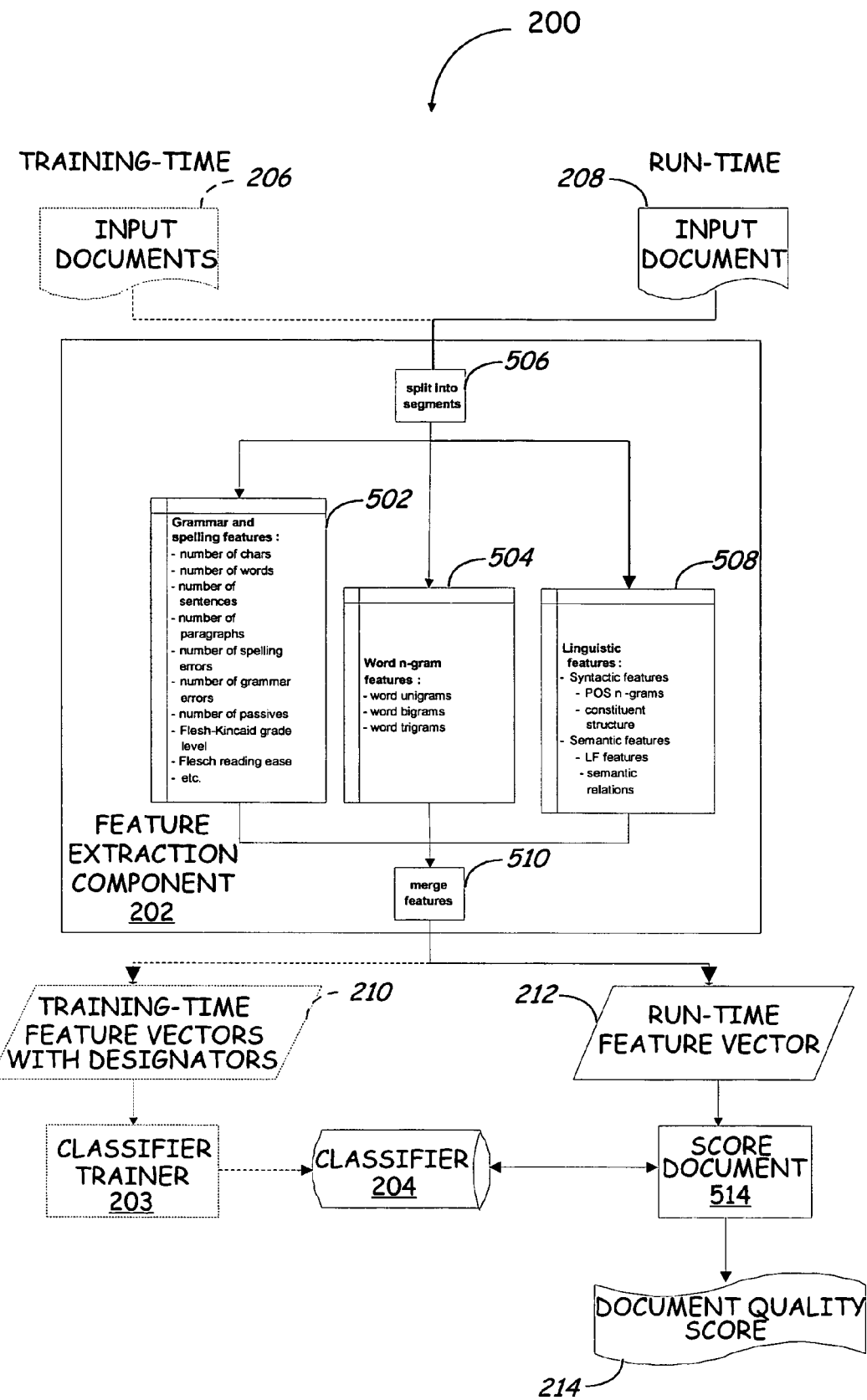
FIG. 5 is a block diagram of a more detailed embodiment of a document editorial quality assessment system of the present invention.

FIG. 5 is a block diagram of a more detailed embodiment of document editorial quality assessment system 200 of the present invention. As shown in FIG. 5, and mentioned earlier, feature extraction component 202 of system 200 extracts grammar and spelling related feature set 502, word n-gram feature set 504 and linguistic feature set 508. A sub-component 506 pre-processes the input and splits it into segments, and provides the segments to components 502, 504 and 508. Any suitable technique, currently known or which may be developed in the future, can be used to implement component 506. Feature extraction component 202 can also be viewed as including several components or sub-components 502, 504 and 508, which extract a grammar and spelling related feature set, a word n-gram feature set and a linguistic feature set, respectively. As can be seen in FIG. 5, each of components 502, 504 and 508 extracts a number of features of a document. For example, in one particular embodiment provided as a non-limiting example, features of a document that are extracted by component 502 include (but are not limited to):

Average word length in characters
Average paragraph length in characters
Average paragraph length in words
Average paragraph length in sentences
Average section length in characters
Average section length in paragraphs
Average section length in sentences
Average section length in words
Average sentence length in characters
Average sentence length in words
Calculated document length in characters
Calculated document length in words
Number of words of length N
Standard deviation of word lengths in a document
Variance of word lengths in a document
Flesch Reading Ease Statistic
Flesch-Kincaid Grade Level
Number of non-space characters
Number of total characters
Number of words
Square root of word count
Quad root of word count
Number of spelling errors (total)
Number of likely typographical errors
Number of non-typographical spelling errors
Number of sentences (punctuation delimited)
Number of passive sentences
Number of active sentences
Number of grammar errors
Number of paragraphs
Number of sections
Number of pages
Ratio of spelling errors to characters
Ratio of spelling errors to total characters Additional features that can be extracted by component 502 include (but are not limited to):

features relating to document formatting, for example the number of boldfaced characters or words and the number of different styles used in a document; and features relating to the sequence of formats in a document, for example: the sequence of heading styles.

As mentioned above, component 504 extracts word n-gram features from documents. In the embodiment of the present invention shown in FIG. 5, these features include word unigrams, bigrams, and trigrams. In other words, in this embodiment, component 504 extracts single words, pairs and triples of consecutive words, and counts their respective frequencies in any particular document. However, n-grams with other values of n can also be extracted. The extracted word n-grams could be inflected (i.e., they could be the actual surface appearance of the word) or they could be stems or lemmatized. For example, instead of using the inflected verb "plays," the stem "play" can be used. Extracting these features during training-time enables classifier trainer 203, which is described further below, to pick out any correlation between these features and the editorial quality of the document.

Component 508 carries out a substantially complete linguistic analysis of each segment (sentence, for example) provided by component 506 of a particular document. Component 508 produces parse or syntax trees and semantic representations (or LFs) for each of the processed sentences. Both syntax trees and LFs were described, in general, earlier.

In one embodiment of the present invention, provided as a non-limiting example, the following feature sets are extracted by component 508:

Part of speech trigrams (sequences of three consecutive part of speech labels).

Constituent structure information from the parse tree. This set of features consists of (for each constituent in a parse tree) the syntactic label, combined with the syntactic labels of all of its immediately dominated daughter nodes.

LF features, comprising:
- Binary features present at nodes in the LF. Such features include: +Quant (quantifier), +Pres (present tense), etc.
- Features expressing the combination of binary analysis features with information about part of speech and semantic relation of the node that they are found on: The feature ProgVerbAttrib, for example, indicates a verb that bears the +Prog (progressive) feature and is in an Attrib (attributive) semantic relation with its parent node.
- Features relating to LF modification structures: The feature Verb Tsub Noun Tobj Verb Mod Adv, for example, indicates a Verb node, that has a Noun subject, a Verb object and an adverbial (Adv) modifier.

Additional features that can be extracted by component 508 include (but are not limited to):
- section level features (for example: the number of noun phrases per document section); and
- paragraph level features (for example: the number of noun phrases per document paragraph).

In essence, component 508 first generates parse trees for sentences and then carries out additional computations on the generated parse trees. This results in the generation of semantic representations of the parse trees. These representations are normalized versions of the parse trees, and include semantic relationships. For example, "The book was read by John" (passive voice) and "John read the book" (active voice) are two different surface sentences and therefore produce two different parse trees. Since these sentences mean the same, they are normalized into one logical form. The above-listed linguistic features are extracted during different stages of computations carried out by component 508.

It should be noted that, in general, a relatively large number of syntactic and semantic features are extracted by component 508. This is because statistical techniques used to train classifier 204 help automatically ensure that the most relevant features are included in classifier 204. For the same reason, a large number of features are also preferably extracted by components 502 and 504.

Features extracted by components 502, 504 and 508 are combined into a single vector per document by a merge features component 510. Merge features component 510 also ensures consistency of feature indices and feature names across vectors obtained from different documents. Accordingly, when a document is being processed, features are extracted and deposited in a "bucket" (data store, file, etc.) for that document. When the entire document is processed, the bucket of features represents a feature vector for that document. It should be noted that component 510 is configured to ensure that no duplicate features are included in a particular bucket. Also, merge features component 510 utilizes a suitable naming scheme that ensures that the same features in different documents have the same name. This is necessary to enable classifier 204 to carry out meaningful comparisons of features while assessing the quality of a document to be classified.

As described earlier in connection with FIG. 2, during training-time, first and final versions of a number of training documents 206 are input into feature extraction component 202, which extracts features from each training document, in a manner described above, and produces a plurality of training-time feature vectors 210 (one for each document).

As can be seen in FIG. 5, training-time feature vectors 210 are presented to classifier trainer 203, which may be a training algorithm or a processing component configured to implement such an algorithm. Such a training algorithm can be (but is not limited to) an algorithm for a naïve Bayes classifier, a support vector machine (SVM), or a maximum entropy classifier.

In general, a classifier can be a function that maps an input attribute vector, $x=(x_1, x_2, x_3, \ldots, x_n)$, to a confidence that the input belongs to a class—that is, $f(x)$=confidence (class). For example, as mentioned above, an SVM classifier can be employed—an SVM generally operates by finding a hyperplane that separates positive examples from negative examples in a multi-dimensional feature space. Other suitable classification approaches include Bayesian networks, neural networks, decision trees and probabilistic classification models providing different patterns of independence. Classification as used herein also is inclusive of statistical regression that is utilized to develop models of priority.

As mentioned above, the result of the training process is trained classifier 204. The trained classifier 204 is saved out to a file, which completes the training phase.

At run-time, classifier 204 can assign a score 214, with the help of document scoring module 514, to a run-time feature vector 212 (generated from a document 208 to be classified). For example, classifier 204 can provide as an output a statistical probability of document 208 being closer in quality to either the first or last versions of the training documents 206. Component 514 can translate this probability into a desired score format. As mentioned above, this score represents the likelihood of the document being closer to edited or unedited documents as observed at training-time. The score can be binary (i.e., "needs further work" or "does not need further work") or continuous (i.e., "the document scores 80 out of 100 points for style"). Thus, in addition to a numeric score, other quality/style assessment outputs are possible.

Embodiments of the present invention are capable of processing a number of different types of documents. For example, the documents could include Microsoft Word documents, Rich Text Format (RTF) documents, etc. In general, any document that comprises text that is stored on a computer readable medium can be processed by the present invention.

Although the above description primarily deals with evaluating documents, the present invention can be utilized, in general, to evaluate textual units. As used herein, a textual unit refers to a document, a paragraph, a sentence or, in general, any string of text. Thus, in addition to the document-level evaluation described above, embodiments of the present invention shown in FIGS. 2 and 5 are also capable of evaluating paragraphs, sentences, etc. Accordingly, embodiments of the present invention can be used to provide feedback on a document beyond just a numeric score for the entire document. Embodiments of the present invention are trained on the sentence-level (i.e., feature vectors are derived from individual sentences instead of documents), and therefore can perform sentence-level classification. Sentence-level scores can then be examined when a new document needs to be evaluated at run-time, and sentences with particularly poor scores (i.e., a high likelihood to be unedited) can be highlighted within the document. Other embodiments may be similarly trained for paragraph-level classification. Some embodiments of the present invention are trained for document-level, sentence level and paragraph-level classification. Such embodiments are particularly useful when, for example, a large document receives a "good" overall (document level) score, but includes a few sentences/paragraphs that are stylistically poorly written. These sentences/paragraphs will receive a "poor" score and will be highlighted within the document. This enables substantially rapid editing of documents that have relatively few poorly written sentences/paragraphs, for example.

Although the present invention has been described with reference to particular embodiments, workers skilled in the art will recognize that changes may be made in form and detail without departing from the spirit and scope of the invention.

What is claimed is:

1. A computer-implementable method for assessing an editorial quality of a textual unit, the method comprising:
   generating, by using computer readable instructions executable by a processor, a plurality of training-time feature vectors by automatically extracting features, which include grammar and spelling features, word n-grams and linguistic analysis features based on automatic syntactic and semantic analysis, from first and last versions of training documents, and combining the extracted grammar and spelling features, the extracted word n-grams and the extracted linguistic analysis features to form the plurality of training-time feature vectors, wherein the first versions of the training documents are unedited documents that represent a first class of text and wherein the last versions of the training documents are edited documents that represent a second class of text;
   training, with the help of the processor, a machine-learned classifier based on the plurality of training-time feature vectors, the machine-learned classifier being capable of classifying the textual unit based on the first class of text and the second class of text;
   generating, with the help of the processor, a run-time feature vector for the textual unit to be assessed by automatically extracting features from the textual unit; and
   evaluating, with the help of the processor, the run-time feature vector using the machine-learned classifier to provide, as an output, an assessment of the editorial quality of the textual unit,
   wherein the assessment of the editorial quality of the textual unit reflects a degree of similarity in quality of the textual unit to either the unedited versions of the training documents that represent the first class of text or the edited versions of the training documents that represent the second class of text, and
   wherein the linguistic analysis features include at least one logical form feature, and
   wherein each of the plurality of training-time feature vectors includes a designator of the editorial quality of a training document, of the training documents, to which it corresponds.

2. The method of claim 1 wherein the textual unit is a document to be assessed.

3. The method of claim 1 wherein the textual unit is a paragraph to be assessed.

4. The method of claim 1 wherein the textual unit is a sentence to be assessed.

5. The method of claim 1 wherein the assessment of the editorial quality of the textual unit is provided as one of a binary score and a continuous score, which reflects the degree of similarity in quality of the textual unit to either the unedited or edited versions of the training documents.

6. The method of claim 1 wherein automatically extracting features from first and last versions of training documents comprises automatically extracting a plurality of feature sets from the first and last versions of the training documents.

7. The method of claim 6 wherein each of the plurality of training-time feature vectors corresponds to one document, and is generated by automatically extracting feature sets from that corresponding document and combining the extracted feature sets to generate the training-time feature vector for that document.

8. The method of claim 1 wherein the designator is indicative of whether the corresponding training document is a first version or a last version.

9. The method of claim 1 wherein the word n-grams include word unigrams, word bigrams and word trigrams.

10. The method of claim 1 wherein the machine-learned classifier is one of a naïve Bayes classifier, a support vector machine, a maximum entropy classifier, a decision tree classifier, a neural network classifier and a Bayesian network classifier.

11. The method of claim 1 wherein the textual unit is a document to be classified, and wherein, in addition to providing the assessment of the editorial quality of the document, the machine-learned classifier provides at least one of an editorial quality assessment of sentences and paragraphs within the document.

12. A computer-implemented system for assessing an editorial quality of a textual unit, the system comprising:
   a processor; and
   a feature extraction component, executed by the processor, configured to generate a plurality of training-time feature vectors by automatically extracting features, which include grammar and spelling features, word n-grams and linguistic analysis features based on automatic syntactic and semantic analysis, from first versions of training documents that represent a first class of text and last versions of training documents that represent a second class of text, and configured to combine the extracted grammar and spelling features, the extracted word n-grams and the extracted linguistic analysis features to form the plurality of training-time feature vectors, and further configured to generate a run-time feature vector for the textual unit to be assessed by automatically extracting features from the textual unit; and
   a machine-learned classifier, trained based on the plurality of training-time feature vectors with the help of the processor, configured to evaluate the run-time feature vector and to provide an assessment of the editorial quality of the textual unit based on a degree of similarity in quality of the textual unit to either the first versions of the training documents that represent the first class of text or the last versions of the training documents that represent the second class of text,
   wherein the first versions of the training documents are unedited documents and wherein the last versions of the training documents are edited documents, and
   wherein the linguistic analysis features include at least one logical form feature, and
   wherein each of the plurality of training-time feature vectors includes a designator of the editorial quality of a training document, of the training documents, to which it corresponds.

13. The system of claim 12 wherein the textual unit is a document to be assessed.

14. The system of claim 12 wherein the textual unit is a paragraph to be assessed.

15. The system of claim 12 wherein the textual unit is a sentence to be assessed.

16. The system of claim 12 wherein the machine-learned classifier is configured to provide the assessment of the editorial quality of the textual unit as one of a binary score and a continuous score, which reflects a degree of similarity in quality of the textual unit to either the first or last versions of the training documents.

17. The system of claim 12 wherein the feature extraction component is configured to automatically extract the features from first and last versions of training documents by automatically extracting a plurality of feature sets from the first and last versions of the training documents.

18. The system of claim 17 wherein the feature extraction component is configured to generate each of the plurality of training-time feature vectors corresponding to one document by automatically extracting feature sets from the corresponding document and combining the extracted feature sets to generate the training-time feature vector for that document.

19. The system of claim 12 wherein the designator is indicative of whether the corresponding training document is a first version or a last version.

20. The system of claim 12 wherein the word n-grams include word unigrams, word bigrams and word trigrams.

21. The system of claim 12 wherein the machine-learned classification component includes one of a naïve Bayes classifier, a support vector machine, a maximum entropy classifier, a decision tree classifier, a neural network classifier and a Bayesian network classifier.

22. The system of claim 12 wherein the textual unit is a document to be classified, and wherein, in addition to being configured to provide the assessment of the editorial quality of the document, the machine-learned classification component is further configured to provide at least one of an editorial quality assessment of sentences and paragraphs within the document.

23. A computer-implementable method of training a machine-learned classifier, the method comprising:

generating, by using computer readable instructions executable by a processor, a plurality of training-time feature vectors by automatically extracting features, which include grammar and spelling features, word n-grams and linguistic analysis features based on automatic syntactic and semantic analysis, from first and last versions of training documents, and combining the extracted grammar and spelling features, the extracted word n-grams and the extracted linguistic analysis features to form the plurality of training-time feature vectors, wherein the first versions of the training documents are unedited documents that represent a first class of text and wherein the last versions of the training documents are edited documents that represent a second class of text; and training, with the help of the processor, the machine-learned classifier based on the plurality of training-time feature vectors, the machine-learned classifier being capable of providing an assessment of an editorial quality of a textual unit based on a degree of similarity in quality of the textual unit to either the first versions of the training documents that represent the first class of text or the last versions of the training documents that represent the second class of text, and wherein the linguistic analysis features include at least one logical form feature, and wherein each of the plurality of training-time feature vectors includes a designator of the editorial quality of a training document, of the training documents, to which it corresponds.

24. The method of claim 23 wherein automatically extracting features from first and last versions of training documents comprises automatically extracting a plurality of feature sets from the first and last versions of the training documents.

25. The method of claim 24 wherein each of the plurality of training- time feature vectors corresponds to one document, and is generated by automatically extracting feature sets from that corresponding document and combining the extracted feature sets to generate the training-time feature vector for that document.

26. The method of claim 23 wherein the designator is indicative of whether the corresponding training document is a first version or a last version.

27. The method of claim 23 wherein the word n-grams include word unigrams, word bigrams and word trigrams.

28. The method of claim 23 wherein the machine-learned classifier is one of a naïve Bayes classifier, a support vector machine, a maximum entropy classifier, a decision tree classifier, a neural network classifier and a Bayesian network classifier.

\* \* \* \* \*